US010458561B1

(12) United States Patent
Engelsman et al.

(10) Patent No.: US 10,458,561 B1
(45) Date of Patent: Oct. 29, 2019

(54) HYDRANT-MOUNTABLE PRESSURE CONTROL AND RELIEF VALVE APPARATUS (71) Applicant: MAGUIRE IRON, INC., Sioux Falls, SD (US)

(72) Inventors: Dan Engelsman, Sioux Falls, SD (US); Brandon Redenius, Hartford, SD (US)

(73) Assignee: Maguire Iron, Inc., Sioux Falls, SD (US)

( * ) Notice: Subject to any disclaimer, the term of this patent is extended or adjusted under 35 U.S.C. 154(b) by 0 days.

(21) Appl. No.: 15/789,227

(22) Filed: Oct. 20, 2017

(51) Int. Cl.
*E03B 9/02* (2006.01)
*F16K 17/06* (2006.01)
*F16K 15/06* (2006.01)
*E03B 7/07* (2006.01)
*E03B 9/04* (2006.01)

(52) U.S. Cl.
CPC .............. *F16K 17/06* (2013.01); *E03B 7/071* (2013.01); *E03B 7/075* (2013.01); *F16K 15/063* (2013.01); *E03B 9/04* (2013.01)

(58) Field of Classification Search
CPC ...... F16K 17/06; F16K 17/048; F16K 17/065; F16K 17/168; E03B 7/075; E03B 7/077; E03B 9/14
See application file for complete search history.

(56) References Cited

U.S. PATENT DOCUMENTS

| 3,035,604 | A | * | 5/1962 | Portis | .................. | F16K 17/0426 |
| | | | | | | 137/327 |
| 3,187,135 | A | | 6/1965 | Singer | | |
| 3,207,179 | A | * | 9/1965 | Klagues | .................. | F16K 17/04 |
| | | | | | | 137/513.3 |
| 3,256,398 | A | | 6/1966 | Snider | | |
| 3,963,044 | A | * | 6/1976 | Brown | .................. | F16K 31/363 |
| | | | | | | 137/490 |
| 3,971,405 | A | * | 7/1976 | Millar | ....................... | B64F 1/28 |
| | | | | | | 137/489 |
| 4,198,030 | A | | 4/1980 | Jackson | | |
| 4,351,356 | A | | 9/1982 | Koiwai | | |

(Continued)

FOREIGN PATENT DOCUMENTS

| EP | 0051961 | 11/1980 |
| EP | 2014963 | 1/2009 |

(Continued)

*Primary Examiner* — Reinaldo Sanchez-Medina
(74) *Attorney, Agent, or Firm* — Jeffrey A. Proehl; Woods, Fuller, Shultz & Smith, PC (57) ABSTRACT

A pressure responsive apparatus may include a valve body having an input to be exposed to pressure in a fluid line and an output to drain fluid from the valve body, and a plunger positioned in the valve body. A pressure chamber may be defined in the valve body between the plunger and the input such that the plunger is exposed to the pressure in the fluid line. The plunger may be movable between a seated position characterized by the plunger blocking fluid movement out of the pressure chamber through the output, and a release position characterized by the plunger permitting fluid movement out of the pressure chamber through the output. A biasing assembly may be configured to bias the plunger toward the seated position and being adjustable to apply an adjustable amount of biasing force to the plunger against the pressure of the fluid in the pressure chamber.

20 Claims, 7 Drawing Sheets

(56) References Cited

U.S. PATENT DOCUMENTS

| | | | |
|---|---|---|---|
| 4,485,843 A | | 12/1984 | Wolff |
| 4,596,263 A | | 6/1986 | Snider |
| 4,653,978 A | * | 3/1987 | Eberhardt ............... F04B 49/22 415/11 |
| 4,674,530 A | * | 6/1987 | Bickford ................ B65D 90/32 137/469 |
| 4,848,398 A | * | 7/1989 | Leach ................... F16K 5/0605 137/556.3 |
| 5,002,088 A | | 3/1991 | Engelhardt |
| 5,094,266 A | * | 3/1992 | Ledbetter .............. F16K 17/082 137/469 |
| 5,257,537 A | | 11/1993 | Bianchi |
| 5,673,563 A | | 10/1997 | Albertson |
| 7,066,201 B2 | * | 6/2006 | Chen .................... F16K 15/063 137/541 |
| 2004/0154659 A1 | * | 8/2004 | Lafalce ................... E03B 9/16 137/218 |
| 2011/0174270 A1 | | 7/2011 | Harhoff |
| 2015/0240962 A1 | | 8/2015 | Plummer |
| 2017/0227135 A1 | | 8/2017 | Crump |

FOREIGN PATENT DOCUMENTS

| | | |
|---|---|---|
| WO | 0142693 | 6/2001 |
| WO | 2010125500 | 11/2010 |

* cited by examiner

HYDRANT-MOUNTABLE PRESSURE CONTROL AND RELIEF VALVE APPARATUS

BACKGROUND

Field

The present disclosure relates to pressure control and relief devices and more particularly pertains to a new hydrant-mountable pressure control and relief valve apparatus for controlling and relieving fluid pressure in a fluid distribution system, such as a water supply network.

SUMMARY

In one aspect, the present disclosure relates to a pressure responsive apparatus for controlling and relieving pressure in a fluid line. The apparatus may comprise a valve body which is elongated along a longitudinal body axis and has a first end and a second end along the longitudinal body axis. The valve body has an interior surface defining an interior and which may define an annular seat. The valve body has an input configured to connect to the fluid line to be exposed to pressure in the fluid line, and an output configured to drain fluid from the valve body. The input and output of the valve body are in fluid communication with the interior of the valve body. The apparatus may also comprise a plunger positioned in the interior of the valve body, and a pressure chamber may be defined in the interior of the valve body between the plunger and the input such that the plunger is exposed to the pressure of the fluid within the pressure chamber. The plunger may be movable between a seated position adjacent to the annular seat and a release position toward the output of the valve body. The seated position of the plunger may be characterized by the plunger blocking fluid movement out of the pressure chamber through the output, and the release position may be characterized by the plunger permitting fluid movement out of the pressure chamber through the output. The apparatus may also comprise a biasing assembly configured to bias the plunger toward the seated position, with the biasing assembly being adjustable to apply an adjustable amount of biasing force to the plunger against the pressure of the fluid in the pressure chamber.

In another aspect, the present disclosure relates to a system which may comprise a water supply network with a water main, a water storage tank in fluid communication with the water main, and a water hydrant in fluid communication with the water main and the water storage tank, the water hydrant having an outlet. The system may also comprise a pressure responsive apparatus in fluid communication with the water main and water storage tank of the water supply network. The apparatus may include a valve body elongated along a longitudinal body axis and having a first end and a second end along the longitudinal body axis. The valve body has an interior surface defining an interior and may define an annular seat. The valve body may have an input removably connected to the output of the water hydrant of the water supply network to expose pressure in the water hydrant and water main to the interior of the valve body, and an output configured to drain fluid from the valve body. The input and output of the valve body are in fluid communication with the interior of the valve body, and the output of the valve body may be in communication with the environment. The apparatus may further include a plunger positioned in the interior of the valve body, and a pressure chamber may be defined in the interior of the valve body between the plunger and the input such that the plunger is exposed to the pressure of the fluid within the pressure chamber. The plunger may be movable between a seated position adjacent to the annular seat and a release position toward the output of the valve body. The seated position of the plunger may be characterized by the plunger blocking fluid movement out of the pressure chamber through the output, and the release position may be characterized by the plunger permitting fluid movement out of the pressure chamber through the output. The apparatus may also include a biasing assembly configured to bias the plunger toward the seated position, with the biasing assembly being adjustable to apply an adjustable amount of biasing force to the plunger against the pressure of the fluid in the pressure chamber.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 7 thereof, a new hydrant-mountable pressure control and relief valve apparatus embodying the principles and concepts of the disclosed subject matter will be described.

The applicants have recognized the need for maintaining a desired pressure in a water supply network, and correspondingly relieving pressure that exceeds the desired pressure, in order to produce various effects, such as maintaining a desired water level in an elevated water storage tank, or water tower, particularly during maintenance operations on the tower. As the water pressure in a water supply network often varies, control of the water pressure in a water main connected to the elevated storage tank requires an ability to relieve the water pressure when it exceeds a particular pressure level.

The applicants have developed an apparatus for use in a system including a water supply network in which the apparatus is able to control the pressure of the water in the network by relieving pressure when the pressure exposed to the apparatus exceeds a set pressure level. The apparatus relieves the pressure by draining water from the system until the pressure in the connected network falls below the set pressure level. Multiple apparatus may be utilized at various points on the water supply network to maintain the desired pressure. The pressure experienced by the apparatus may be monitored utilizing an integrated pressure gauge.

Figure 1:
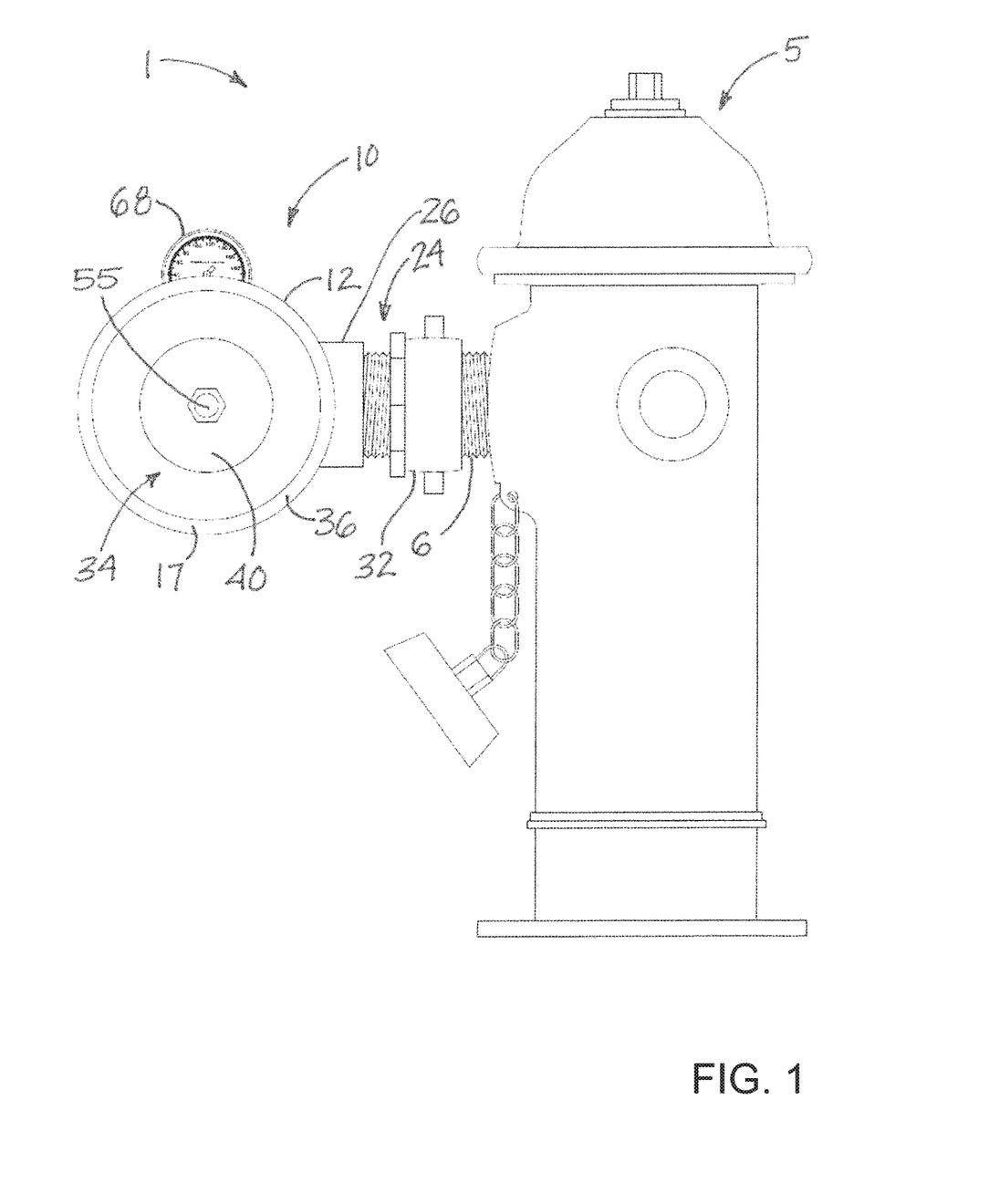
FIG. 1 is a schematic end view of a new hydrant-mountable pressure control and relief valve apparatus mounted for use on an illustrative hydrant, according to the present disclosure.
Figure 2:
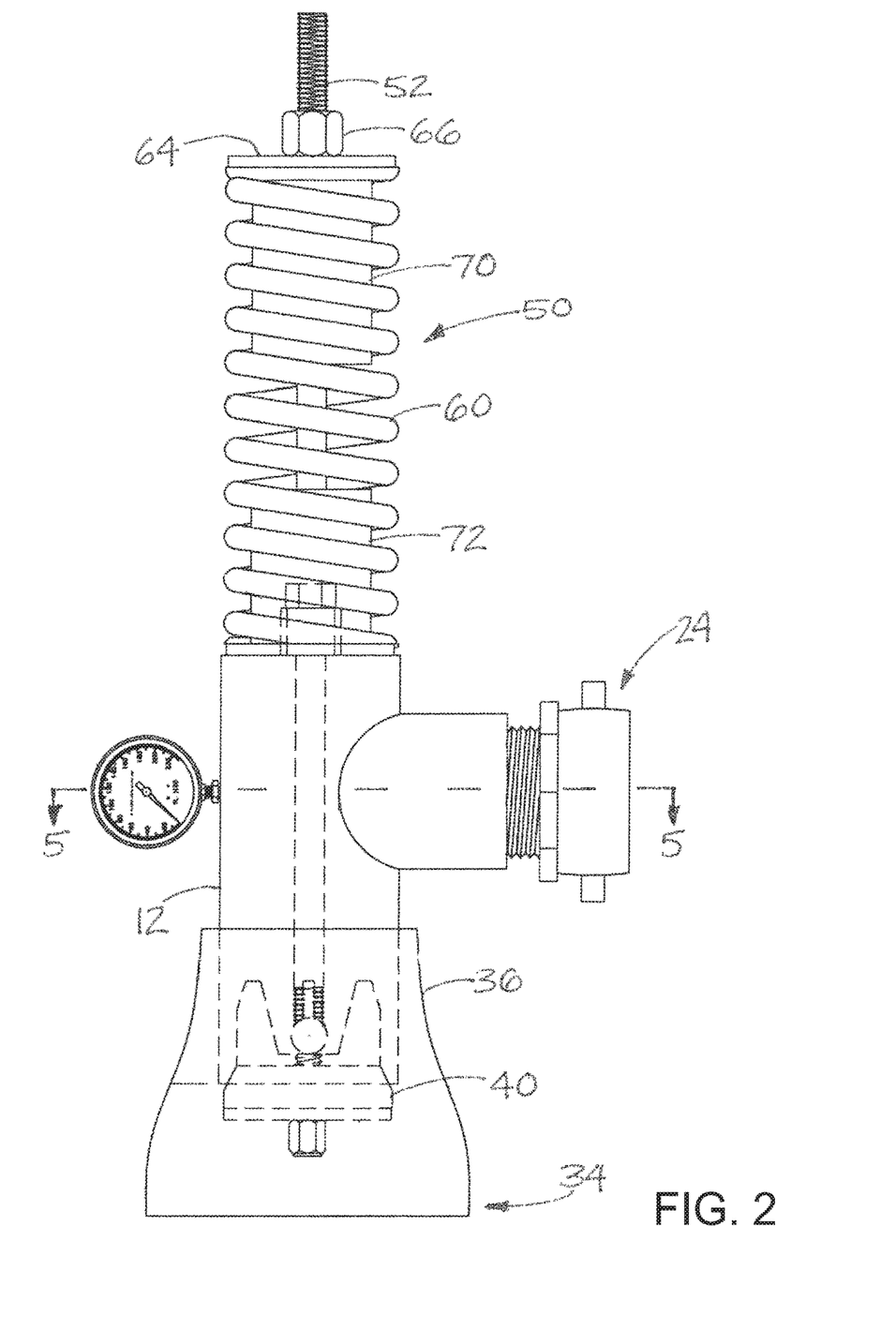
FIG. 2 is a schematic top view of the apparatus, according to an illustrative embodiment.
Figure 3:
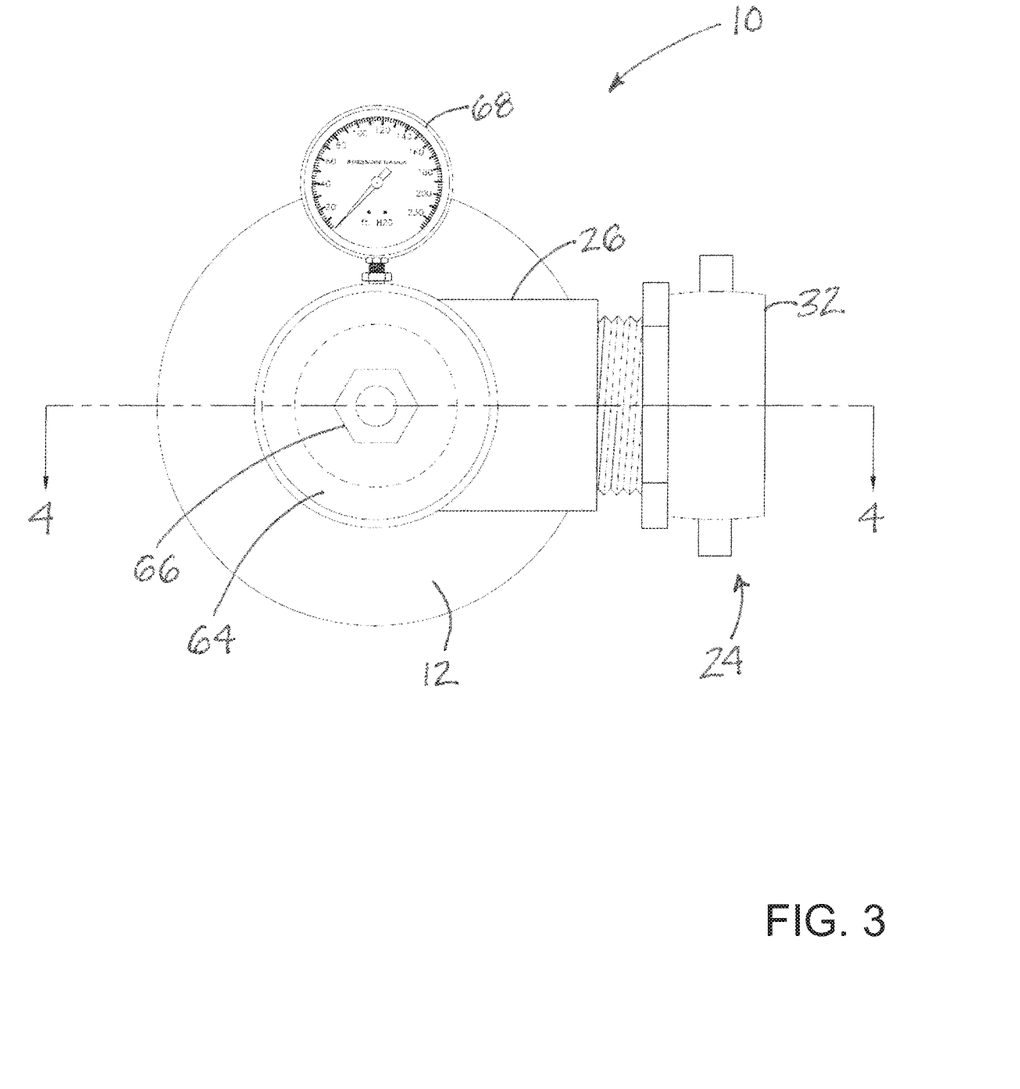
FIG. 3 is a schematic opposite end view of the apparatus, according to an illustrative embodiment.
Figure 4:
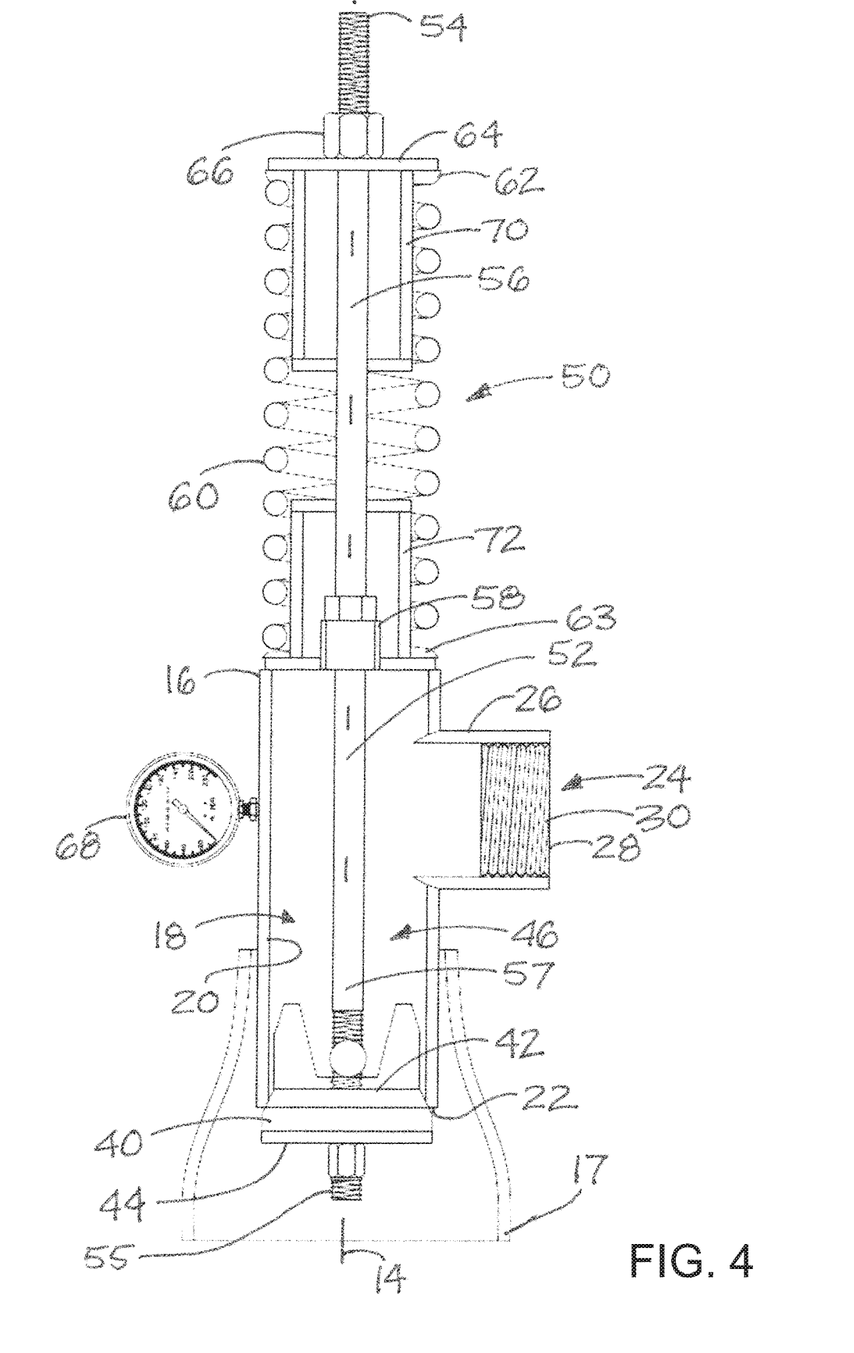
FIG. 4 is a schematic sectional of the apparatus taken along line 4-4 of FIG. 3, according to an illustrative embodiment.
Figure 5:
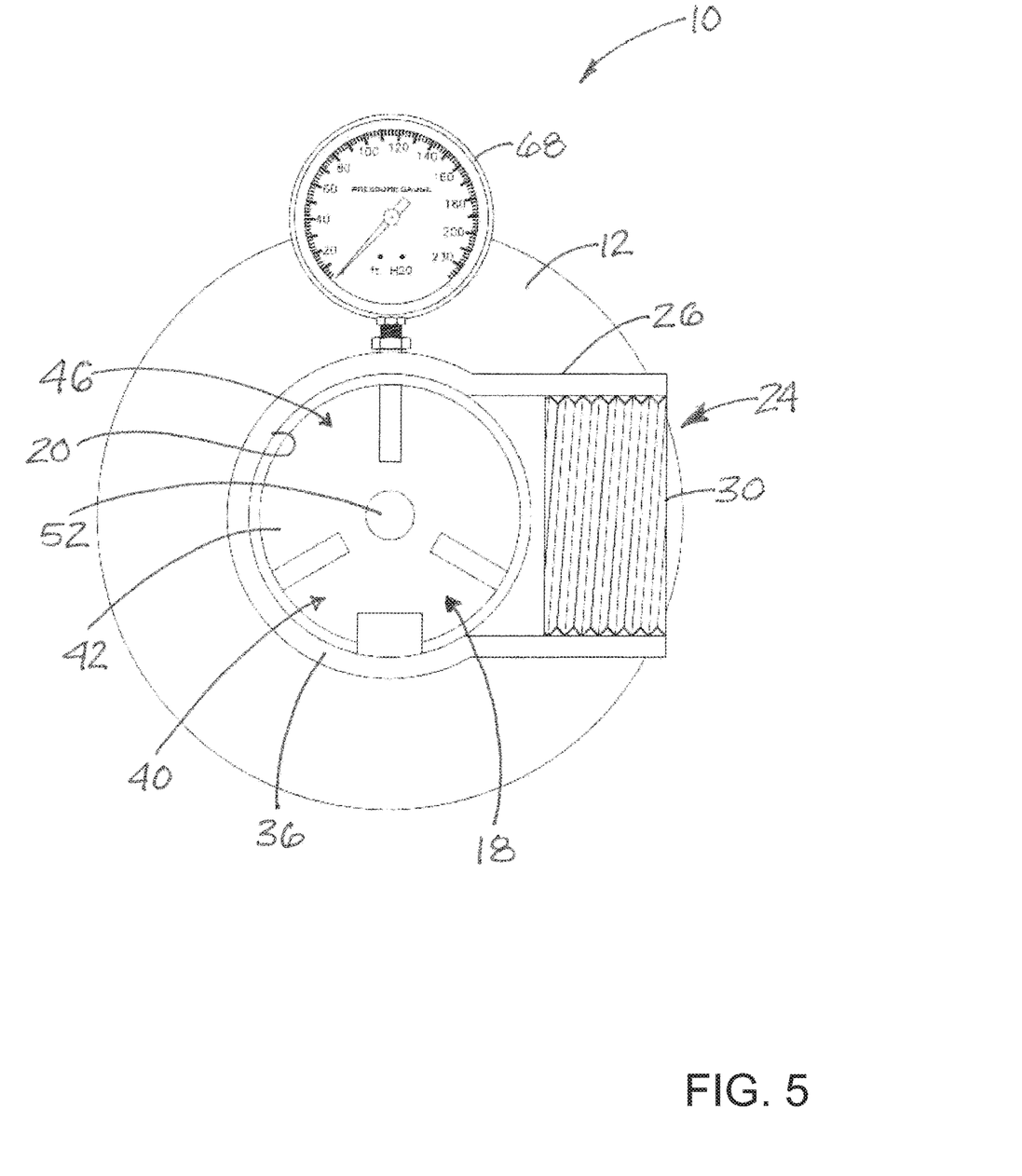
FIG. 5 is a schematic sectional view of the apparatus taken along line 5-5 of FIG. 2, according to an illustrative embodiment.
Figure 6:
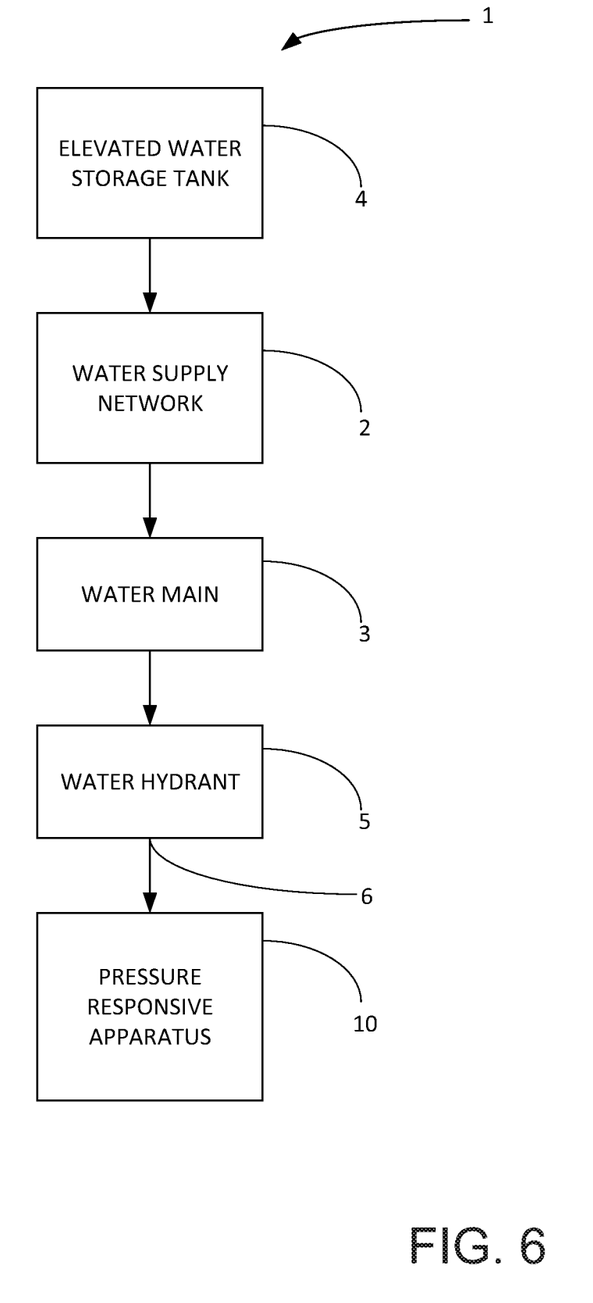
FIG. 6 is a schematic diagram of the system according to an illustrative embodiment.
Figure 7:
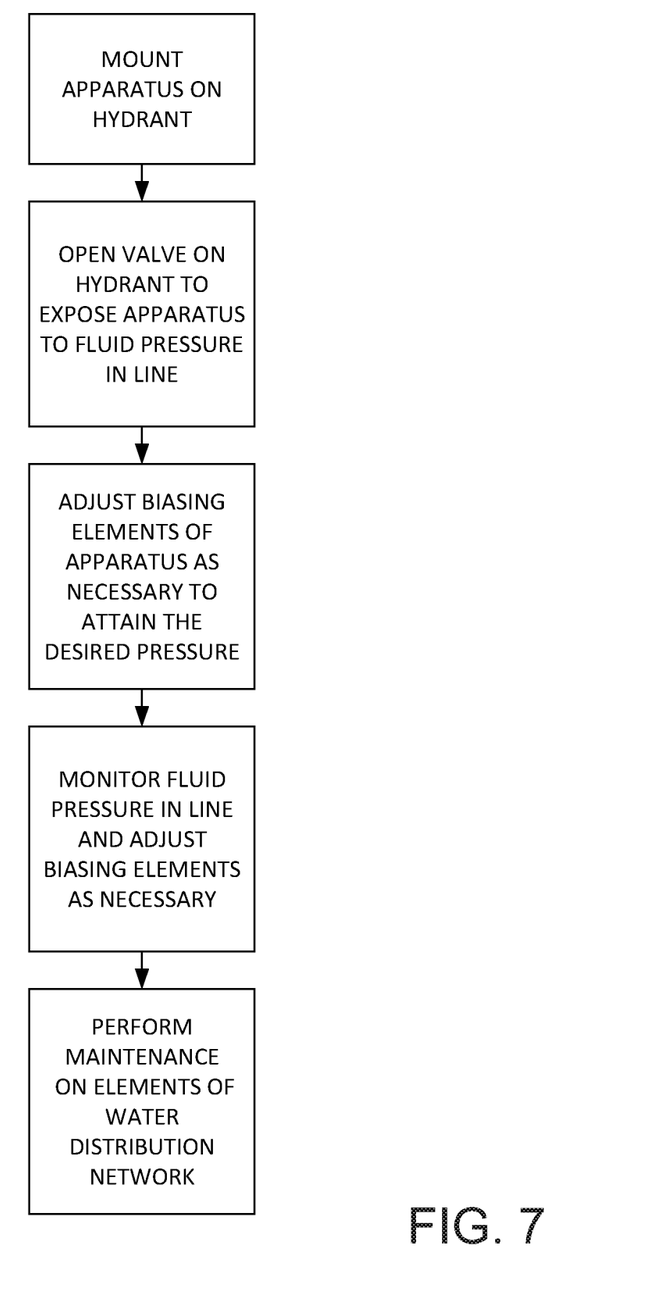
FIG. 7 is a schematic flow diagram of a method associated with the system according to an illustrative embodiment.

In some aspects, the disclosure relates to a system 1 that includes a water supply network 2 of a municipal or rural water supply system. The water supply network 2 may include one or more water mains 3, a water storage tower or elevated tank 4, and at least one water hydrant 5 which is in fluid communication with the water main 3 and the elevated water storage tank 4. The water hydrant 5 may have an outlet 6 which typically has a standardized coupling nipple with external threading.

Another aspect of the disclosure relates to a pressure responsive apparatus 10 which may be utilized with or without other elements of the system 1. The pressure responsive apparatus 10 may provide a portable and temporary apparatus for controlling and relieving pressure above a desired degree in a fluid line such as the water main 3 and elevated tank 4.

The pressure responsive apparatus 10 may include a valve body 12 which may be generally elongated along a longitudinal body axis 14. The longitudinal body axis 14 of the valve body may be substantially horizontally oriented when the apparatus 10 is mounted for use on a hydrant. The valve body 12 may have a first end 16 and a second end 17. The valve body 12 may also define an interior 18 with an interior surface 20 which forms an annular seat 22.

The valve body 12 may have an input 24 which is configured to be exposed to fluid pressure in the fluid line or water main via, for example, the hydrant. The input 24 may be in fluid communication with the interior 18 of the valve body such that fluid entering the input 24 is able to enter and occupy the interior. The input 24 may be positioned on a side of the valve body 12 to orient the longitudinal body axis 14 in a substantially horizontal orientation when the input 24 is connected to an outlet 6 of the hydrant. In some embodiments, the input 24 may be formed by a tubular protrusion 26 on the valve body, and the protrusion may extend along an axis that is oriented substantially perpendicular to the longitudinal body axis 14 and may extend generally horizontally when the apparatus 10 is positioned for use. The tubular protrusion 26 may have a distal end 28, and an input opening 30 may be located at the distal end. The input opening 30 may be positioned in opposition to an opening on the outlet of the hydrant. The input 24 may also include an input fitting 32 which is configured to connect to the outlet 6 of the hydrant. The input fitting 32 may be substantially freely rotatable with respect to the tubular protrusion of the valve body, and may be internally threaded to engage external threads on the coupling nipple of the outlet 6.

The valve body 12 may also have an output 34 which is configured to drain fluid from the interior of the valve body. The output of the valve body may dispense water to the environment and thus does not return water to the water supply network 2. The output 34 may be located at the second end 17 of the valve body, a position which facilitates drainage of any fluid released by the apparatus to the environment without requiring, for example, additional piping or hoses although additional hoses may be employed to guide water away from the output. The valve body 12 may also include a perimeter wall 36, and the perimeter wall may have a bell-shape toward the second end 17 of the body 12 and may have a substantially cylindrical shape toward the first end 16 of the body 12.

The apparatus 10 may also include a plunger 40 which is positioned in the valve body 12, may be located in the interior 18 of the body. The plunger 40 may be positionable in the annular seat 22 defined by the valve body, and may be movable between a seated position in which the plunger is adjacent to the annular seat, and a release position in which the plunger is moved away from the annular seat and generally toward the output 34 of the valve body. The plunger 40 may have an inner surface 42 which is oriented toward the input 24 of the valve body and an outer surface 44 which is oriented toward the output 34 of the body. A pressure chamber 46 may be defined in the interior 20 of the valve body between the plunger 40 and the input 24 such that the plunger is exposed to the pressure of any fluid with in the pressure chamber.

The apparatus 10 may also include a biasing assembly 50 which is configured to bias the plunger 40 toward the seated position of the plunger. The biasing assembly 50 may be adjustable to apply an adjustable amount of biasing force to the plunger against the pressure of the fluid in the pressure chamber 46. In greater detail, the biasing assembly 50 may include a biasing rod 52 which is mounted on the plunger 40 and may extend through the interior of the valve body and may pass out of the interior through an opening in the valve body. The biasing rod 52 may be generally horizontally oriented when the apparatus 10 is mounted for use, and the biasing rod may have first end 54 and a second end 55. The biasing rod may have a first end portion 56 which is positioned outside of the interior 20 of the valve body and a second end portion 57 which is positioned in the interior of the valve body. The biasing rod 52 may extend through a seal 58 which is mounted on the valve body to preserve the water tightness of the interior of the valve body. A section of the first end portion 56 of the biasing rod may have a threaded exterior.

The biasing assembly 50 may also include a biasing spring 60 which is connected to the biasing rod 52 to bias the plunger into the seated position and against the annular seat. The biasing spring may be positioned outside of the interior 18 of the body, and may be positioned adjacent to the first end 16 of the valve body. The biasing rod may extend through the biasing spring, and the first end portion of the biasing rod positioned inside the biasing spring. The biasing spring 60 may have an outer end 62 and an inner end 63, and the inner end may be positioned adjacent to the first end 16 of the valve body.

A retaining plate 64 may be included in the biasing assembly 50 to retain the biasing spring 60 on the biasing rod 52. The retaining plate 64 may be mounted on the biasing rod to capture the biasing spring between the retaining plate and the valve body. The retaining plate 64 may be mounted on the first end portions 56 of the biasing rod 52, and may be positioned adjacent to the outer end 62 of the biasing spring. The position of the retaining plate 64 on the biasing rod may be adjustable to adjust a degree of compression of the biasing spring between the retaining plate and the valve body to thereby adjust the degree of pressure at which the plunger is moved out of the seated position toward the release position to thereby permit fluid to leave the pressure chamber 46 and the interior of the valve body such that pressure relief occurs in the apparatus and the connected hydrant and water main. A retaining nut 66 may be threadedly mounted on the biasing rod so that rotation of the nut 66 in a first rotational direction causes the nut to increase pressure applied against the retaining plate and the biasing spring, and rotation of the nut in a second rotational direction causes the nut to decrease pressure applied against the retaining plate and the biasing spring.

The apparatus 10 may also include a pressure gauge 68 which is configured to sense and display or otherwise communicate the pressure of the fluid in the interior, and more specifically the pressure chamber 46, of the valve body. The pressure gauge 68 may be mounted on the valve body at a location exterior to the valve body, and may be placed in communication with the interior of the valve body through a hole extending through the perimeter wall 36 of the body. It will be appreciated that other types and configurations of pressure sensing devices may be employed.

In some embodiments, the apparatus 10 may also include a first spring support 70 which is positioned in the biasing spring 60 adjacent to the retaining plate 64, and the first spring support may have a central bore through which a portion of the biasing rod 52 extends. A second spring support 72 may be positioned in the biasing spring adjacent to the valve body, and may have a central bore through which a portion of the biasing rod also extends. A gap may be formed between the first 70 and second 72 spring supports to permit contraction of the biasing spring when the fluid pressure applied to the inner surface of the plunger overcomes the biasing force applied by the spring to the rod and the plunger.

In an illustrative application, the pressure response of apparatus 10 may be employed to relieve water pressure in a water main connected to an elevated water storage tank for the purpose of maintaining a desired water level in the tank during various types of tank maintenance. The apparatus 10 may be mounted on one of the standard hydrant outlet 6 connections of the hydrant 5 using the input fitting 32 by engaging threads on the fitting 32 with threads on the outlet 6.

Once connected to the hydrant, a valve on the hydrant may be opened so that fluid or water in the water main 3 is able to reach the outlet 6 of the hydrant. The pressure gauge 68 may reflect the pressure of the fluid in the pressure chamber 46 as well as in the hydrant and the water main to which the hydrant is connected.

The position of the retaining nut 66 on the biasing rod 52 may be adjusted to adjust the biasing force applied by the spring to the rod and by the rod to the plunger by, for example, tightening or loosening the nut on the rod. Observation of the pressure indicated by the pressure gauge 68 as well as any fluid flow past the plunger may be utilized to determine the desired adjustment of the retaining nut. Should the pressure of the fluid in the chamber 46 as well as the hydrant and water main exceed the pressure setting of the apparatus 10, the plunger 40 is moved by the pressure exerted by the fluid on the inner surface of the plunger to move the plunger from the seated position toward the release position, thereby allowing fluid in the pressure chamber 46 to move past the plunger and through the output 30 for the valve body.

Once the fluid pressure on the plunger decreases to a level approximately equal to the force applied to the plunger by the biasing elements, the plunger may move from the release position to the seated position to thereby discontinue movement of fluid past the plunger out of the pressure chamber 46. By controlling the pressure of the fluid in the hydrant and thus in the main, the fluid level in the elevated storage tank may be controlled and held to a maximum desirable level to permit maintenance work to be performed on the tank.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A pressure responsive apparatus for controlling and relieving pressure in a fluid line, the apparatus comprising:
a valve body being elongated along a longitudinal body axis, the valve body having a first end and a second end along the longitudinal body axis, the valve body having an interior surface defining an interior and an annular seat, the valve body having an input configured to connect to the fluid line to be exposed to pressure in the fluid line, the valve body having an output configured to drain fluid from the valve body, the input and output of the valve body being in fluid communication with the interior of the valve body;
a plunger positioned in the interior of the valve body, a pressure chamber being defined in the interior of the valve body between the plunger and the input of the valve body such that the plunger is exposed to the pressure of the fluid within the pressure chamber, the plunger being movable between a seated position adjacent to the annular seat and a release position toward the output of the valve body, the seated position of the plunger being characterized by the plunger blocking fluid movement out of the pressure chamber through the output, the release position being characterized by the plunger permitting fluid movement out of the pressure chamber through the output; and
a biasing assembly configured to bias the plunger toward the seated position, the biasing assembly including an adjustment structure configured to apply an adjustable amount of biasing force to the plunger against the pressure of the fluid in the pressure chamber, the adjustment structure being positioned exterior of the pressure chamber defined between the plunger and the input of the valve body to facilitate adjustment of the biasing assembly.

2. The apparatus of claim 1 wherein the biasing assembly includes:
a biasing rod mounted on the plunger and extending through the valve body to pass out of the interior of the valve body; and
a biasing spring connected to the biasing rod to bias the plunger into the seated position and against the annular seat, the biasing spring being positioned exterior of the pressure chamber defined between the plunger and the input of the valve body.

3. The apparatus of claim 2 wherein the biasing rod has a first end portion positioned outside of the interior of the valve body and a second end portion positioned in the interior of the valve body, the biasing spring being positioned outside of the interior of the valve body.

4. The apparatus of claim 2 wherein the biasing assembly additionally includes:
a retaining plate configured to connect the biasing spring to the biasing rod, the retaining plate being mounted on the biasing rod to capture the biasing spring between the retaining plate and the valve body.

5. The apparatus of claim 4 wherein the adjustment structure of the biasing assembly adjusts a position of the retaining plate on the biasing rod to adjust a degree of compression of the biasing spring between the retaining plate and the valve body to thereby adjust a pressure at which the plunger moves out of the seated position toward the release position to permit fluid to leave the interior of the valve body.

6. The apparatus of claim 5 wherein the adjustment structure of the biasing assembly additionally includes:
a retaining nut threadedly mounted on the biasing rod such that rotation of the nut in a first rotational direction causes the nut to increase pressure applied against the retaining plate and the biasing spring, and rotation of the nut in a second rotational direction causes the nut to decrease pressure applied against the retaining plate and biasing spring.

7. The apparatus of claim 6 wherein a first end portion of the biasing rod extends through the biasing spring and the retaining plate is mounted on the first end portion of the biasing rod such that the retaining plate is positioned adjacent to an outer end of the biasing spring.

8. The apparatus of claim 2 wherein the body defines a fluid flow path between the input of the valve body and the output of the valve body along which fluid flows through the apparatus when the plunger moves out of the seated position toward the release position, the biasing spring being located exterior of the fluid flow path.

9. The apparatus of claim 8 wherein the biasing spring is positioned on an exterior of the apparatus to facilitate visual inspection of the biasing spring without removal of parts from the apparatus.

10. The apparatus of claim 4 additionally comprising a first spring support positioned in the biasing spring adjacent to the retaining plate.

11. The apparatus of claim 10 additionally comprising a second spring support positioned in the biasing spring adjacent to the valve body.

12. The apparatus of claim 1 additionally comprising a pressure gauge configured to sense a pressure of the fluid in the pressure chamber.

13. The apparatus of claim 12 wherein the pressure gauge is mounted on the valve body exterior of the interior of the valve body.

14. The apparatus of claim 1 wherein the input is positioned on a side of the valve body and formed by a tubular protrusion on the valve body.

15. The apparatus of claim 14 wherein the tubular protrusion extends along an axis oriented substantially perpendicular to the longitudinal body axis of the valve body.

16. The apparatus of claim 1 additionally comprising an input fitting at the input of the valve body and being configured to connect to an outlet of a hydrant.

17. The apparatus of claim 1 wherein the valve body includes a perimeter wall, the perimeter wall having a bell shape at the output of the valve body.

18. A system comprising:
a water supply network including:
a water main;
a water storage tank in fluid communication with the water main; and
a water hydrant in fluid communication with the water main and the water storage tank, the water hydrant having an outlet; and
a pressure responsive apparatus in fluid communication with the water main and water storage tank of the water supply network,
the apparatus comprising:
a valve body being elongated along a longitudinal body axis, the valve body having a first end and a second end along the longitudinal body axis, the valve body having an interior surface defining an interior and an annular seat, the valve body having an input removably connected to the outlet of the water hydrant of the water supply network to expose pressure in the water hydrant and water main to the interior of the valve body, the valve body having an output configured to drain fluid from the valve body, the input and output of the valve body being in fluid communication with the interior of the valve body, the output of the valve body being in communication with the environment;

a plunger positioned in the interior of the valve body, a pressure chamber being defined in the interior of the valve body between the plunger and the input such that the plunger is exposed to a pressure of the fluid within the pressure chamber, the plunger being movable between a seated position adjacent to the annular seat and a release position toward the output of the valve body, the seated position of the plunger being characterized by the plunger blocking fluid movement out of the pressure chamber through the output, the release position being characterized by the plunger permitting fluid movement out of the pressure chamber through the output; and a biasing assembly configured to bias the plunger toward the seated position, the biasing assembly being adjustable to apply an adjustable amount of biasing force to the plunger against the pressure of the fluid in the pressure chamber.

19. The system of claim 18 wherein the water storage tank is an elevated water storage tank.

20. A pressure responsive apparatus for controlling and relieving pressure in a fluid line, the apparatus comprising:

a valve body being elongated along a longitudinal body axis, the valve body having a first end and a second end along the longitudinal body axis, the valve body having an interior surface defining an interior and an annular seat, the valve body having an input configured to connect to the fluid line to be exposed to pressure in the fluid line, the valve body having an output configured to drain fluid from the valve body, the input and output of the valve body being in fluid communication with the interior of the valve body;

a plunger positioned in the interior of the valve body, a pressure chamber being defined in the interior of the valve body between the plunger and the input of the valve body such that the plunger is exposed to the pressure of the fluid within the pressure chamber, the plunger being movable between a seated position adjacent to the annular seat and a release position toward the output of the valve body, the seated position of the plunger being characterized by the plunger blocking fluid movement out of the pressure chamber through the output, the release position being characterized by the plunger permitting fluid movement out of the pressure chamber through the output; and a biasing assembly configured to bias the plunger toward the seated position, the biasing assembly including:
  a biasing rod mounted on the plunger and extending through the valve body to pass out of the interior of the valve body; and
  a biasing spring connected to the biasing rod to bias the plunger into the seated position and against the annular seat, the biasing spring being positioned exterior of the pressure chamber defined between the plunger and the input of the valve body; and
wherein the body defines a fluid flow path between the input of the valve body and the output of the valve body along which fluid flows through the apparatus when the plunger moves out of the seated position toward the release position, the biasing spring being located exterior of the fluid flow path.

\* \* \* \* \*